United States Patent
Gardner et al.

(10) Patent No.: US 11,906,377 B2
(45) Date of Patent: Feb. 20, 2024

(54) DIFFERENTIAL TRANSDUCER WITH BELLOWS COUPLING

(71) Applicant: KULITE SEMICONDUCTOR PRODUCTS, INC., Leonia, NJ (US)

(72) Inventors: Robert Gardner, Westwood, NJ (US); Louis DeRosa, Saddle River, NJ (US)

(73) Assignee: KULITE SEMICONDUCTOR PRODUCTS, INC., Leonia, NJ (US)

( * ) Notice: Subject to any disclaimer, the term of this patent is extended or adjusted under 35 U.S.C. 154(b) by 21 days.

(21) Appl. No.: 17/477,186

(22) Filed: Sep. 16, 2021

(65) Prior Publication Data

US 2022/0090976 A1   Mar. 24, 2022

Related U.S. Application Data

(60) Provisional application No. 63/080,095, filed on Sep. 18, 2020.

(51) Int. Cl.
  *G01L 19/00* (2006.01)
  *G01L 13/02* (2006.01)

(52) U.S. Cl.
  CPC ........ *G01L 13/025* (2013.01); *G01L 19/0038* (2013.01)

(58) Field of Classification Search
  None
  See application file for complete search history.

(56) References Cited

U.S. PATENT DOCUMENTS

| | | | | |
|---|---|---|---|---|
| 4,695,817 A | * | 9/1987 | Kurtz | G01L 19/0654 338/42 |
| 7,197,934 B2 | * | 4/2007 | Wittrisch | G01L 9/0039 385/13 |
| 7,275,444 B1 | * | 10/2007 | Kurtz | G01L 19/143 73/717 |
| 10,132,156 B2 | * | 11/2018 | Leeflang | E21B 47/017 |
| 2007/0227252 A1 | * | 10/2007 | Leitko | G01L 9/0079 73/717 |
| 2009/0314094 A1 | * | 12/2009 | Kurtz | G01L 13/025 73/721 |
| 2016/0223420 A1 | * | 8/2016 | Grimes | G01L 13/025 |
| 2017/0122827 A1 | * | 5/2017 | DeRosa | G01L 19/142 |
| 2017/0241852 A1 | * | 8/2017 | Wade | G01L 9/0054 |
| 2017/0363496 A1 | * | 12/2017 | DeRosa | G01L 9/06 |

* cited by examiner

*Primary Examiner* — Brandi N Hopkins
*Assistant Examiner* — Nigel H Plumb
(74) *Attorney, Agent, or Firm* — Troutman Pepper Hamilton Sanders LLP; James E. Schutz; Mark Lehi Jones

(57) ABSTRACT

A differential pressure transducer assembly having an internal bellows coupling configured to improve reliability and ease assembly. The differential pressure transducer assembly includes a header, a sensing element mounted on the header, a first pressure port having a first pressure media channel in communication with a first side of the sensing element, a second pressure port having a second pressure media channel in communication with a second side of the sensing element, and a bellows coupling disposed between the header and the second pressure port. The bellows coupling may be configured to flex during assembly to compensate for tolerance mismatches. The bellows coupling may further reduce or prevent external stress from being applied to one or more of the header and the sensing element.

9 Claims, 5 Drawing Sheets

DIFFERENTIAL TRANSDUCER WITH BELLOWS COUPLING

CROSS-REFERENCE TO RELATED APPLICATIONS

This application claims the benefit of U.S. Provisional Patent Application No. 63/080,095, filed 18 Sep. 2020, which is incorporated by reference herein in its entirety.

TECHNICAL FIELD

The disclosed technology relates to a differential pressure transducer assembly having an internal bellows coupling configured to improve reliability and ease assembly.

BACKGROUND

Pressure transducer assemblies typically include one or more sensor elements mounted on a header, with the header attached to a housing. In a differential pressure transducer, a main inlet port directs main pressure from the measurement environment through the housing to a front side of the sensor element, and a reference inlet port directs reference pressure to the back side of the sensor element so that a difference in the applied pressures can be measured.

When a transducer is installed in the field, two separate pressure connections are typically routed to the transducer: one for the main pressure and one for the reference pressure. Often this is accomplished by two separate hard line tubes made from some variety of stainless steel. If the (external) hard line tube attached to the main inlet port is misaligned with respect to the reference inlet port (as is often the case), the resulting applied torque can impart stresses to the sensor element and can create an offset and/or other artifacts in the output signal.

A conventional differential pressure transducer 100 is illustrated in FIG. 1. This transducer 100 design utilizes a sleeve 108 between the main port 103 and the reference port 104 to absorb the above-mentioned stresses from misaligned external hard line tubes, thus providing the advantage of reducing or eliminating stress-related artifacts in the output signal. This transducer 100 has a pressure sensing chip 101 mounted to a header 102, with main pressure routed to the front side of the chip 101 through the main port 103 and reference pressure routed to the back side of the chip through the reference port 104. The body of the reference port 104 is secured to the body of the main port 103 via the sleeve 108 that is welded to both parts. As depicted in FIG. 1, a separate elongated reference tube 105 is attached at one end to the reference port 104 using a nut 106 and crush ring 107. The reference tube 105 is bent in a u-shape, routed to the back side of the sensor chip 101, and sealed at the other end to the header 102. It can be time-consuming to bend the reference tube 105 for proper alignment and coupling to the associated components at each end, and the nut 106 and crush ring 107 are prone to leaking. Furthermore, the long, small diameter reference tube 105 can limit the frequency response of the reference pressure measurement. A need exists for an improved transducer assembly configuration that is more reliable and easier to assemble while maintaining insensitivity to applied stress.

BRIEF SUMMARY

The disclosed technology includes a differential pressure transducer assembly having internal bellows disposed between and joining a rear pressure port and a header. The resulting compact configuration can provide certain reliability and assembly advantages over conventional designs. In some implementations, the improved configuration disclosed herein may enable internal routing of reference pressure without requiring the typical reference tube and its associated drawbacks.

According to an example implementation of the disclosed technology, a differential pressure transducer assembly is provided. The differential pressure transducer assembly includes a header; a sensing element mounted on the header; a first pressure port having a first pressure media channel in communication with a first side of the sensing element; a second pressure port having a second pressure media channel in communication with a second side of the sensing element; and a bellows coupling disposed between the header and the second pressure port. The bellows coupling may be configured to flex to reduce or prevent external stress from being applied to one or more of the header and the sensing element.

A method is disclosed for assembling a differential transducer assembly having a bellows coupling. The method includes mounting a sensing element to a header and coupling a first pressure port to a first portion of the header. The first pressure port can include a first pressure media channel configured to communicate a first pressure with a first side of the sensing element. The method can include attaching a first end of a bellows coupling to a second portion of the header and attaching a second pressure port to a second end of the bellows coupling. The second pressure port can include a second pressure media channel configured to communicate a second pressure with a second side of the sensing element. The method can include mating and securing a first portion of a sleeve to the first pressure port and a second portion of the sleeve to the second pressure port.

Other implementations, features, and aspects of the disclosed technology are described in detail herein and are considered a part of the claimed disclosed technology. Other implementations, features, and aspects can be understood with reference to the following detailed description, accompanying drawings, and claims.

DETAILED DESCRIPTION

Figure 1:
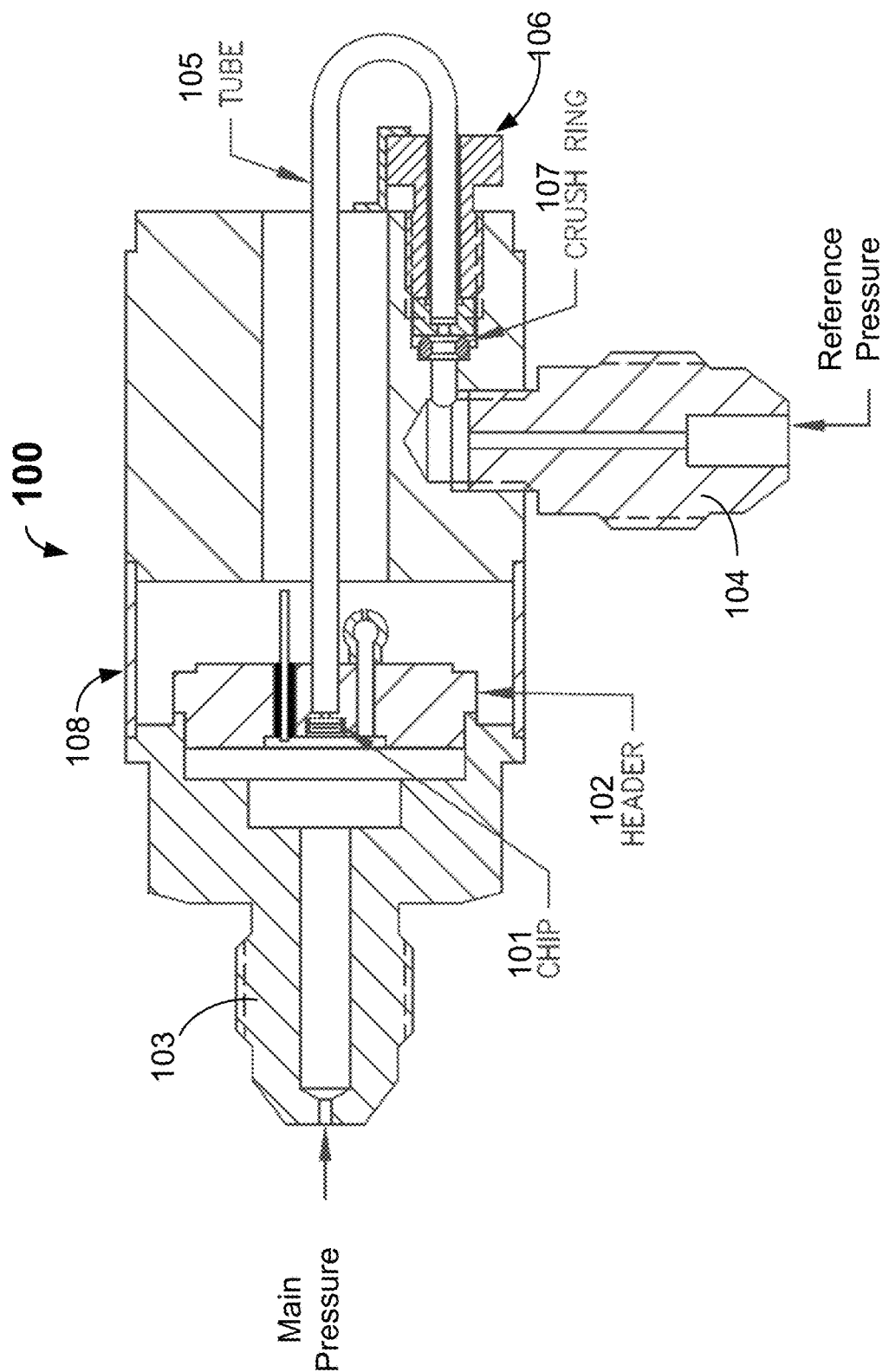
FIG. 1 depicts a conventional differential pressure transducer assembly 100.

Although many embodiments of the disclosed technology are explained in detail, it is to be understood that other embodiments are contemplated. Accordingly, it is not intended for the disclosed technology to be limited in scope to the details of construction and arrangement of components set forth in the following description or illustrated in the drawings. The disclosed technology is capable of other embodiments and of being practiced or carried out in various ways. Also, in describing the preferred embodiments, specific terminology will be resorted to for the sake of clarity.

Referring now to the figures, in which like numerals represent like elements, certain example implementations of the disclosed technology are described herein. It is to be understood that the figures and descriptions have been simplified to illustrate elements that are relevant for a clear understanding, while eliminating, for purposes of clarity, many other elements found in typical pressure sensor assemblies and methods of making and using the same. Those of ordinary skill in the art will recognize that other elements may desirable and/or required for implementation. However, because such elements are well known in the art, and because they do not facilitate a better understanding of the disclosed technology, a discussion of such elements is not provided herein.

According to certain example implementations, a transducer assembly is disclosed for measuring one or more parameters or properties associated with an input condition stream. The term "condition stream" as used herein may refer to a measurement medium, such as a liquid or a gas. The transducer assembly may be configured to measure pressure and/or temperature associated with the condition stream. For example, in one illustrative implementation, the transducer assembly may be configured to measure the dynamic and/or static oil pressure within a machine. The transducer assembly disclosed herein may be utilized to measure a differential pressure between a first input condition stream entering a first inlet port and a second input condition stream entering a second inlet port. The terms "main" and "reference" used herein may refer respectively to the first and second input condition stream. However, in some implementations, such designations may be arbitrary.

Figure 2:
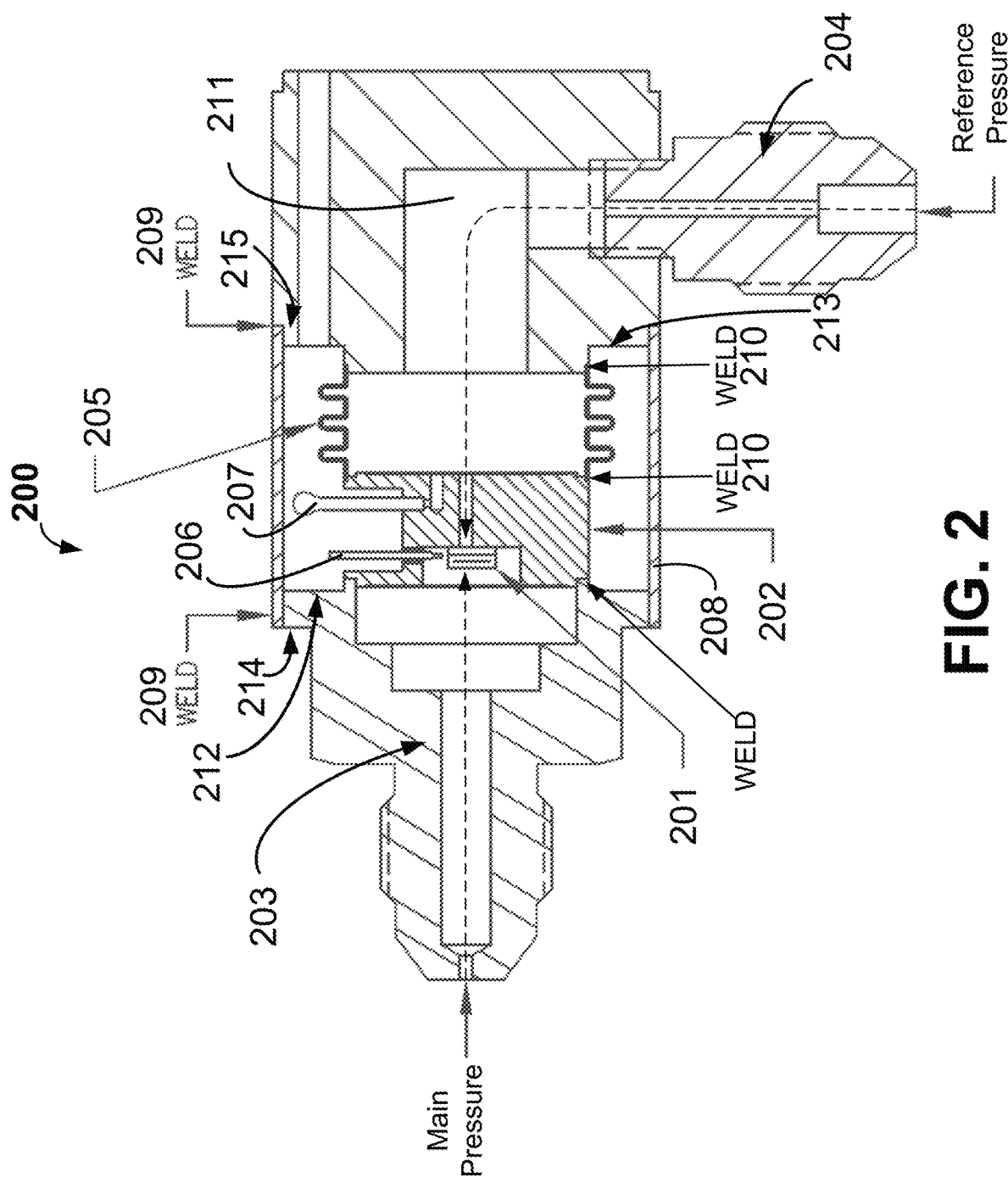
FIG. 2 illustrates a differential pressure transducer assembly 200 with a bellows coupling 205, in accordance with certain implementations of the disclosed technology.

To overcome some of the drawbacks associated with a conventional differential pressure transducer (such as the conventional differential pressure transducer 100 discussed above with reference to FIG. 1), an improved differential pressure transducer assembly 200 is provided and illustrated in FIG. 2 in accordance with certain exemplary implementations of the disclosed technology. The transducer assembly 200 can include a pressure sensing element 201 mounted to a front side of a header 202 such that main pressure may be routed to the front side of the sensing element 201 through a channel in the main pressure port 203. In an exemplary implementation, reference pressure may be routed to the back side of the sensing element 201 via a channel in the reference pressure port 204 and through a bellows coupling 205 having a first and second end, where the first end may be mated to a portion of the header 202, and where the second end of the bellows coupling 205 may be attached to a mating portion 213 of the reference port 204. The body of the reference port 204 may be secured to the body of the main port 203 via a sleeve 208 that may be welded 209 to respective mating portions 214, 215 of the main port 203 and the reference port 204.

The configuration depicted in FIG. 2 solves certain reliability and assembly problems that may be associated with conventional differential transducer designs, for example, by the elimination of a reference tube (such as reference tube 105 as discussed above with reference to FIG. 1), and by utilizing the bellows coupling 205 that can flex and bend during assembly. The bellows coupling 205 may also flex to reduce a transfer of stress to the header 202 and/or the sensing element 201 that may be caused by a torque between the main port 203 and the reference port 204. In this respect, the use of the bellows coupling 205 and/or the sleeve 208 may also reduce or eliminate associated errors in the output signal due to bending of the sensor element 201, for example, due to torque applied to the reference port 204 by external tubing, etc. In certain exemplary implementations, the size, thickness, and/or corrugation period and/or depth of the bellows can be adjusted depending on the pressure range of the pressure media incident at reference port 204, and/or anticipated stresses caused by external tubing, etc.

Certain implementations of the improved differential pressure transducer assembly 200 disclosed herein may improve part alignment and/or enable automatic alignment of the associated components during assembly. The bellows coupling 205, for example, may enable simplified management of part misalignment and/or tolerance variation between the main port 203 and the reference port 204. The bellows coupling 205, for example, may flex during the sleeve 208 installation and/or during the associated welding process in which the sleeve 208 is securely welded 209 to the main port 203 and the reference port 204 at corresponding mating portions 214, 215. If the bellows coupling 205 were not flexible, for example, a mismatch in alignment or tolerance of the associated rigid parts may impart stress to the header 202. Furthermore, if the bellows coupling 205 were not flexible, it may be difficult to fully align both the inner diameter of the assembly (where the bellows coupling 205 is welded 210 to the reference pressure port 204 and the header 202) and the outer diameter of the assembly (where the sleeve is welded 209 to mating portions 214, 215, for example) during assembly.

Certain configurations of the differential pressure transducer assembly 200 (illustrated in FIG. 2) may further solve certain reliability issues that can be associated with conventional differential transducers, for example, as discussed above with reference FIG. 1, via the elimination of the narrow diameter reference tube 105, nut 106, and crush ring 107, which can be prone to leaking. Certain example implementations of the disclosed technology may enable the use of a simplified reference pressure channel 211 to replace the above-mentioned parts, to route pressure media from the reference port 204 to the back side of the sensor element 201, and to improve sealing reliability.

In certain exemplary implementations of the disclosed technology (not shown), the bellows coupling 205 may be disposed between the main pressure port 203 and the header 202 (as opposed to the embodiment depicted in FIG. 2 where the bellows coupling 205 is disposed between the reference pressure port 204 and the header 202).

In certain exemplary implementations, the bellows coupling 205 may be mated to a first mating portion 212 of the main pressure port 203 and a first mating portion 213 of the reference pressure port 204. In certain exemplary implementations, the sleeve 208 may be mated to a second mating portion 214 of the main pressure port 230 and a second mating portion 215 of the reference pressure port 204. In certain implementations, one or more welds may be made at these junctions to secure and seal the bellows coupling 205 to the corresponding components.

FIG. 2 depicts an oil fill channel between the base of the oil-filled bulb 207 and the back side of the header 202. Another channel (not shown) may connect the oil-filled bulb 207 to an oil-filled enclosure/diaphragm (not shown) in communication with the front (main) side of the sensor element 201. In accordance with certain exemplary implementations of the disclosed technology, and as depicted in FIG. 2, header pin(s) 206 and/or the oil-filled bulb 207 may be oriented vertically (i.e., perpendicular to an axis of the main pressure port 203), as will be discussed further in reference to FIG. 4. Certain implementations may utilize other header and header pin configurations as disclosed in U.S. Pat. No. 8,191,424, which is incorporated herein by reference as if presented in full.

As discussed herein, the term "axis" is intended to refer to a reference line in a Cartesian-coordinate system that is co-located with an axis of the transducer assembly. Unless described otherwise herein, the axis of the transducer assembly is defined as the rotationally invariant axial dimension of the transducer assembly main pressure inlet port defined at least by a substantially cylindrical portion of the main inlet port and/or interfacing nipple of the transducer assembly. For embodiments having main inlet ports that are characterized other than cylindrical, (rectangular or square, for example) the axis may be defined as being substantially perpendicular to a joining surface between the transducer assembly and an external equipment interface port to which the transducer assembly is configured for coupling.

Figure 3:
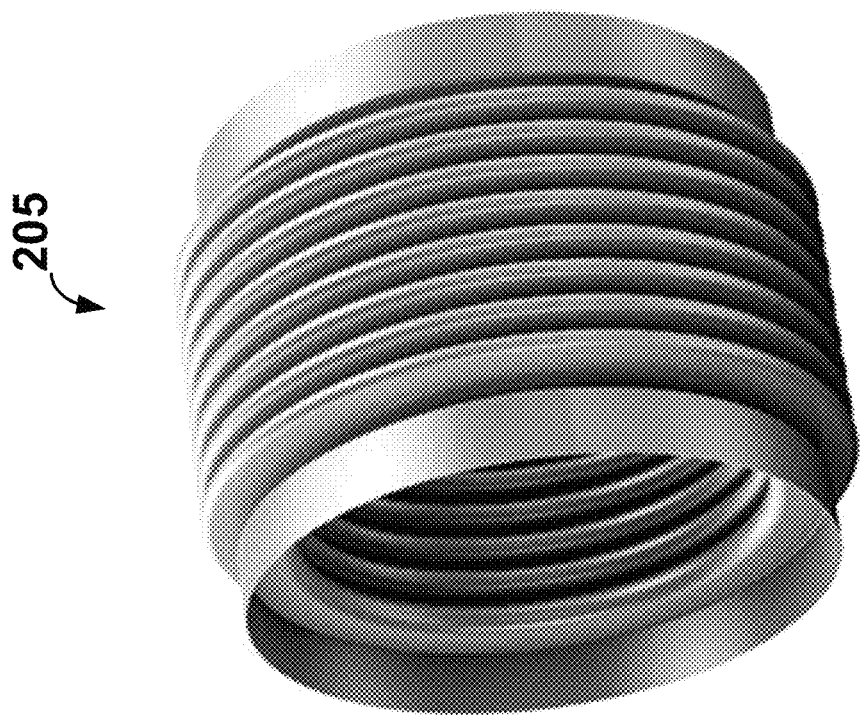
FIG. 3 illustrates an example bellows coupling 205, in accordance with certain exemplary implementations of the disclosed technology.

FIG. 3 illustrates an example bellows coupling 205 that may be utilized in the differential pressure transducer assembly 200 as shown in FIG. 2. The bellows coupling 205 (which may also be known as a corrugated pipe coupling) is a connecting element that provides torsional rigidity while allowing for offset connections at its two ends, which can enable axial, radial and/or angular misalignment to be compensated. In certain exemplary implementations, the bellows coupling 205 may be made of stainless steel alloys. In some implementations, the bellows coupling 205 may comprise nickel. Other metals and/or alloys may be utilized without departing from the scope of the disclosed technology. The material, rigidity, diameter, length and/or the number of corrugations in the bellows coupling 205 may be selected, as desired, for a given application.

Figure 4:
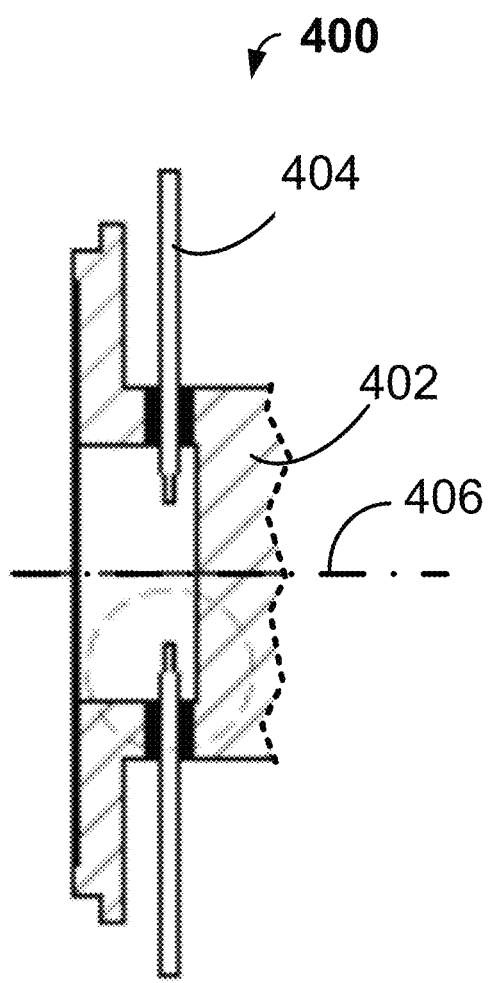
FIG. 4 illustrates a header portion 402 of an example pressure transducer assembly 400 having header pins 404 that extend through a portion of the header 402, in accordance with certain exemplary implementations of the disclosed technology.

FIG. 4 illustrates an exemplary implementation 400 of a portion of a header 402 having at least one header pin 404 that extends substantially perpendicular to the axis 406 and through sides of the header (rather than through a back portion of a header as shown in FIG. 1), according to the disclosed technology. While not shown, the header pins may be electrically connected to a sensing element to supply power to the sensing element and/or to route the resulting pressure signal from the sensing element to external equipment. In accordance with certain exemplary embodiments, the perpendicular orientation of the header pins 404 with respect to the axis 406, as shown in FIG. 4 may provide for a more compact transducer package without requiring electrical connections to be routed out of the back side and may enable additional improvements that can simplify the assembly of the transducer. Certain implementations of the header 202 and/or pins 206 as shown in FIG. 2 may correspond to the header 402 and/or pins 404 as shown in FIG. 4.

Figure 5:
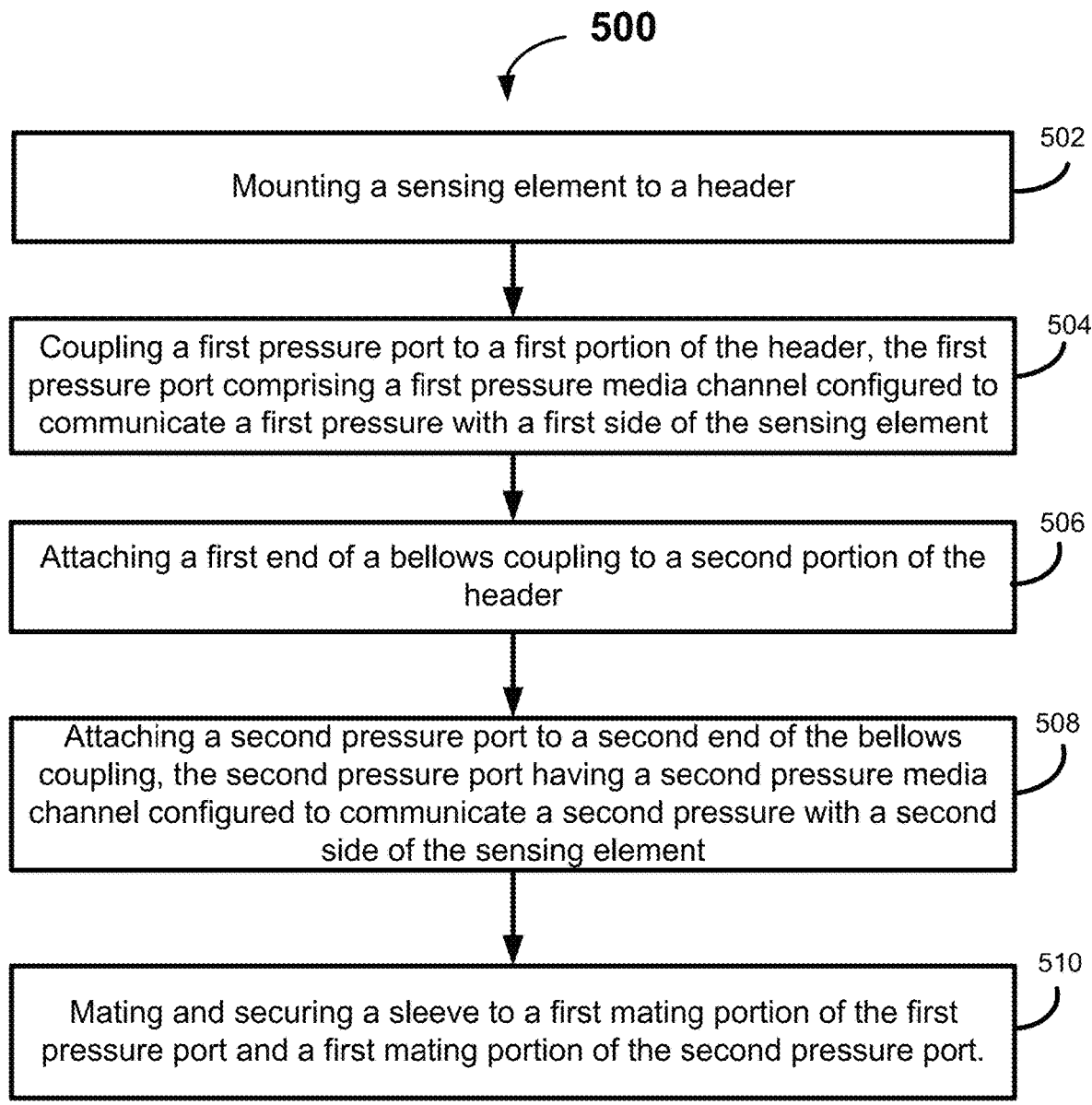
FIG. 5 illustrates a method 500 of assembling of a transducer having a bellows coupling, in accordance with certain implementations of the disclosed technology.

FIG. 5 is a flow diagram of a method 500 for assembling a differential transducer assembly having a bellows coupling. In block 502, the method 500 includes mounting a sensing element to a header. In block 504, the method 500 includes coupling a first pressure port to a first portion of the header, the first pressure port comprising a first pressure media channel configured to communicate a first pressure with a first side of the sensing element. In block 506, the method 500 includes attaching a first end of a bellows coupling to a second portion of the header. In block 508, the method 500 includes attaching a second pressure port to a second end of the bellows coupling, the second pressure port having a second pressure media channel configured to communicate a second pressure with a second side of the sensing element. In block 510, the method 500 includes mating and securing a sleeve to the first pressure port and the second pressure port.

In certain exemplary implementations, the bellows coupling may be configured to route pressure media applied at the second pressure port to the second side of the sensing element.

In certain exemplary implementations, the bellows coupling may be configured to flex to reduce or prevent external stress from being applied to one or more of the header and the sensing element.

In certain exemplary implementations, the bellows coupling may be configured to flex to accommodate a dimensional tolerance mismatch between the sleeve and the first mating portion of the first pressure port and the first mating portion of the second pressure port.

In certain exemplary implementations, the bellows coupling may be mated to a first mating portion of the first pressure port and a first mating portion of the second pressure port.

In certain exemplary implementations, the sleeve may be mated to a second mating portion of the first pressure port and a second mating portion of the second pressure port.

In certain implementations, one or more welds may be made at one or more of the first mating portion of the first pressure port, the second mating portion of the first pressure port, the first mating portion of the second pressure port, and the second mating portion of the second pressure port, for example, to secure and seal the bellows coupling to the corresponding components.

In accordance with certain exemplary implementations of the disclosed technology, the first pressure port may be a main pressure port, and the second pressure port may be a reference pressure port.

In accordance with certain exemplary implementations of the disclosed technology, the first pressure port may be a reference pressure port, and the second pressure port may be a main pressure port.

Certain exemplary implementations of the disclosed technology can include inserting and sealing to the header, two or more header pins. In certain exemplary implementations, each of the two or more header pins may extend through a side wall of the header and may be in electrical communication with the sensing element.

In certain exemplary implementations, the two or more header pins may be perpendicular to an axis of the differential transducer assembly.

In certain exemplary implementations, the two or more header pins may be parallel to an axis of the differential transducer assembly.

In certain exemplary implementations, the sleeve may be secured to a first mating portion of the first pressure port and a second mating portion of the second pressure port.

According to an exemplary implementation of the disclosed technology, the bellows coupling may be configured to flex to accommodate a dimensional tolerance mismatch between portions of one or more of the sleeve, the first pressure port, and the second pressure port.

In certain exemplary implementations, the sleeve may be welded to mating portions of the first pressure port and the second pressure port.

In accordance with certain exemplary implementations of the disclosed technology, the first pressure port may be a main pressure port and the second pressure port may be a reference pressure port. In certain exemplary implementations, the bellows coupling may be disposed between the reference pressure port and the header. In accordance with certain exemplary implementations of the disclosed technology, the bellows coupling may be disposed between the main pressure port and the header.

Certain example implementations of the differential pressure transducer assembly can include two or more header pins disposed perpendicular to an axis of the differential transducer assembly. In certain exemplary implementations, each two or more header pins may extend through a side wall of the header and may be in electrical communication with the sensing element.

Those skilled in the art will appreciate that the system of equations describing the flow of pressure P through a pipe may be reduced to a wave equation in one dimension:

$$\frac{1}{c^2}\left(\frac{\partial^2 P'}{\partial t^2} + K\frac{32\mu}{\rho D^2}\frac{\partial P'}{\partial t}\right) = \frac{\partial^2 P'}{\partial x^2},$$

where c is the velocity of sound in the unconfined fluid (measurement media) and K is the fluid bulk modulus. The damping coefficient, $$K\frac{32\mu}{\rho D^2},$$

is dependent on both the pipe diameter D and viscosity (μ) of the media. With appropriate boundary conditions, the wave equation may be solved using Laplace transforms such that the frequency response of the pipe structure may be analytically estimated.

As the equation above illustrates, when the pressure flow is in an inlet channel having a large aspect ratio (for example, a smaller diameter D and long length L) the damping is increased. As the flow reaches the cavity (for example, a main pressure cavity associate with the main pressure port, or reference pressure cavity 211 shown in FIG. 2) of a set volume, the flow may be damped as the media expands to fill the cavity. By manipulating the diameter D and length L of the inlet passage and the volume of the cavity, the damping ratio, and cut-off frequency can be well tuned for the respective application. In this way, undesired ripple frequency can be substantially reduced or eliminated, while still retaining lower frequency components that are desirable to measure.

Using standard system dynamic analysis, an equation may be derived for the resonant frequency of the transducer assembly. The formula for the resonant frequency F may be expressed as:

$$F = \frac{\sqrt{(3\pi r^2 c^2 / 4LV)}}{2\pi},$$

where r is the internal radius of the inlet channel, c is the velocity of sound in the input stream pressure media, L is the length of the inlet channel, and V is the volume of the cavity. When an inlet passage and cavity structure is tuned to match the pressure ripple frequency, the ripple pressure can be amplified and can exceed the pressure rating of the transducer, the housing, and/or other parts of the assembly. For example, exceeding the rated pressure can apply excessive stresses on the transducer die and cause the transducer to fail.

Referring again to FIG. 2, and as may be appreciated by inspection of the resonant frequency equation above, the increase in the resonant frequency is roughly proportional to a corresponding increase in the radius r for inlet passages having a larger diameter D. However, as the inlet passage diameter D is decreased below about 1 mm (0.039") in diameter, capillary action can begin to take effect, reducing the corresponding change in resonant frequency, and resulting in diminishing returns of the reduction in the resonant frequency, and in some applications, making the inlet channel susceptible to clogging with the decreasing channel diameter D.

As may also be appreciated by inspection of the equation above, the resonant frequency F is also inversely proportional to the square root of the length L of the inlet passage and the volume V of the cavity. Therefore, the pressure ripple can be suppressed by increasing the inlet channel length L and/or increasing the volume V of the cavity.

In accordance with certain exemplary implementations of the disclosed technology, and as discussed above, the inlet channels may be configured to have diameters ranging from about 0.010" to about 0.100". In some implementations, the diameter of the inlet channels may range from 0.01" to 0.02". In some implementations, the diameter of the inlet channels may range from 0.02" to 0.04". In some implementations, the diameter of the inlet channels may range from 0.04" to 0.06". In some implementations, the diameter of the inlet channels may range from 0.06" to 0.08". In some implementations, the diameter of the inlet channels may range from 0.08" to 0.10". In some implementations, the diameter of the inlet channels may range from 0.10" to 0.20".

One skilled in the art will appreciate that narrowing the inlet ports and/or channels (i.e., decreasing the diameter) enhances attenuation. However, if it is too narrow for the applied pressure media, desirable low-frequency components (e.g., static and quasi-static pressures) may also be eliminated, which may interfere with the accuracy of the sensing element. Conversely, if the inlet ports and/or channels are too wide, high-frequency ripples may not be sufficiently eliminated, which can also interfere with the accuracy of the sensing element and can decrease its operable lifespan. It is clear that the similarity in the piping between the main port and the reference ports allows for better frequency matching between the ports. This can be important when both ports may experience similar rise times and it may be important to measure the response of both compared to each other.

As used in the specification and the appended claims, the singular forms "a," "an," and "the" include plural referents unless the context clearly dictates otherwise. Also, in describing the preferred embodiments, certain terminology has been utilized for the sake of clarity. It is intended that each term contemplates its broadest meaning as understood by those skilled in the art and includes all technical equivalents which operate in a similar manner to accomplish a similar purpose.

Ranges have been expressed herein as from "about" or "approximately" one particular value and/or to "about" or "approximately" another particular value. When such a range is expressed, an implementation includes values from the one particular value (starting point) and/or to the other particular value (ending point). In certain embodiments, the term "about" signifies a buffer of +/−5% of the said range about each said starting point and/or ending point.

As used herein, the terms "comprising" or "containing" or "including" mean that at least the named element or method step is present in the composition or article or method, but does not exclude the presence of other compounds, materials, particles, method steps, even if the other such compounds, material, particles, method steps have the same function as what is named.

Numerous characteristics and advantages have been set forth in the foregoing description, together with details of structure and function. While the disclosed technology has been disclosed in several forms, it will be apparent to those skilled in the art that many modifications, additions, and deletions, especially in matters of shape, size, and arrangement of parts, can be made therein without departing from the spirit and scope of the disclosed technology and its equivalents as set forth in the following claims. Therefore, other modifications or embodiments as may be suggested by the teachings herein are particularly reserved as they fall within the breadth and scope of the claims here appended.

What is claimed is:

1. A differential pressure transducer assembly, comprising:
   a header;
   a differential pressure sensing element mounted on the header;
   a first pressure port having a first pressure media channel in communication with a first side of the differential pressure sensing element;
   a second pressure port having a second pressure media channel in communication with a second side of the differential pressure sensing element; and
   a bellows coupling disposed between the header and the second pressure port.

2. The differential pressure transducer assembly of claim 1, wherein the bellows coupling is configured to flex to reduce or prevent an external stress from being applied to one or more of the header and the differential pressure sensing element.

3. The differential pressure transducer assembly of claim 1, wherein the bellows coupling is configured to route pressure media applied at the second pressure port to the second side of the differential pressure sensing element.

4. The differential pressure transducer assembly of claim 1, wherein the bellows coupling is welded to a portion of the header, and wherein the bellows coupling is welded to a portion of the second pressure port.

5. The differential pressure transducer assembly of claim 1, further comprising a sleeve mated and secured to a second mating portion of the first pressure port and a second mating portion of the second pressure port.

6. The differential pressure transducer assembly of claim 5, wherein the bellows coupling is configured to flex to accommodate a dimensional tolerance mismatch between the sleeve and one or more of the second mating portion of the first pressure port and the second mating portion of the second pressure port.

7. The differential pressure transducer assembly of claim 5, wherein the sleeve is welded to the second mating portion of the first pressure port and wherein the sleeve is welded to the second mating portion of the second pressure port.

8. The differential pressure transducer assembly of claim 1, wherein the first pressure port is a main pressure port, wherein the second pressure port is a reference pressure port.

9. The differential pressure transducer assembly of claim 1, further comprising two or more header pins disposed perpendicular to an axis of the differential transducer assembly, each of the two or more header pins extending through a side wall of the header and in electrical communication with the differential pressure sensing element.

* * * * *